(12) United States Patent
Eriksen et al.

(10) Patent No.: US 10,454,342 B2
(45) Date of Patent: Oct. 22, 2019

(54) ROTATIONAL MOVEMENT CONTROL OF AN ELECTRIC GENERATOR BY MEANS OF A TURNING DEVICE

(71) Applicant: Siemens Gamesa Renewable Energy A/S, Brande (DK)

(72) Inventors: Uffe Eriksen, Horsens (DK); Edom Lemma, Vejle (DK); Claus Thygesen, Låsby (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 74 days.

(21) Appl. No.: 15/469,626

(22) Filed: Mar. 27, 2017

(65) Prior Publication Data

US 2017/0288501 A1  Oct. 5, 2017

Related U.S. Application Data

(60) Provisional application No. 62/315,257, filed on Mar. 30, 2016.

(30) Foreign Application Priority Data

Mar. 30, 2016 (DE) .................. 10 2016 205 250
Mar. 30, 2016 (EP) .................... 16163002

(51) Int. Cl.
*H02K 7/18* (2006.01)
*H02K 7/00* (2006.01)
*H02K 7/10* (2006.01)

(52) U.S. Cl.
CPC .............. *H02K 7/183* (2013.01); *H02K 7/00* (2013.01); *H02K 7/10* (2013.01); *H02K 7/18* (2013.01); *H02K 7/1807* (2013.01); *H02K 7/1838* (2013.01); *Y02E 10/725* (2013.01)

(58) Field of Classification Search
CPC .. H02K 7/00; H02K 7/10; H02K 7/18; H02K 7/1807; H02K 7/183; H02K 7/1838;
(Continued)

(56) References Cited

U.S. PATENT DOCUMENTS 4,291,233 A * 9/1981 Kirschbaum ....... F16H 37/0833
290/1 C
4,960,006 A    10/1990 Moore
(Continued)

FOREIGN PATENT DOCUMENTS

CN     202194786 U    4/2012
EP     1167754 A2     1/2002
(Continued)

OTHER PUBLICATIONS

European Search Report dated Jan. 5, 2017; Application No. 16163002. 5; 16 Pgs.
(Continued)

*Primary Examiner* — Tran N Nguyen
(74) *Attorney, Agent, or Firm* — Schmeiser, Olsen & Watts LLP (57) ABSTRACT

An electric generator is provided including a stator assembly, a rotor assembly being rotatably supported at the stator assembly for rotating around a rotational axis, an annular device being fixed to the rotor assembly and including an engagement structure, and a first turning device being mounted to the stator assembly, the first turning device including an actuator and an engagement element being drivable by the actuator. The first turning device is configured for adopting two operational states, an active operational state and a passive operational state. In the active operational state there is an engagement between the engagement element and the engagement structure and in the passive operational state the engagement element and the engagement structure are mechanically decoupled from each other.

13 Claims, 5 Drawing Sheets

(58) Field of Classification Search
CPC ......... H02K 7/1869; F03D 1/00; F03D 1/001; F03D 1/003; F03D 1/02; F03D 1/025; F03D 1/04; F03D 1/06; F03D 1/0658; F03D 1/0666; F03D 1/0675; F03D 7/0204; F03D 7/0232; F03D 7/0272; F03D 9/11; F03D 9/25; F03D 11/00; F03D 11/04; F03D 13/00; F03D 13/10; F03D 15/00; F03D 15/10; F03D 80/00; F03D 80/50; F03D 80/55; F03D 80/70; F01D 25/36; F16C 32/0436
See application file for complete search history.

(56) References Cited

U.S. PATENT DOCUMENTS

| | | | |
|---|---|---|---|
| 2008/0197639 A1* | 8/2008 | Brander | ............... F03D 1/025 290/55 |
| 2012/0181792 A1 | 7/2012 | Pettersen et al. | |
| 2017/0288501 A1 | 10/2017 | Eriksen et al. | |

FOREIGN PATENT DOCUMENTS

| | | |
|---|---|---|
| EP | 2566017 A1 | 3/2013 |
| EP | 2767708 B1 | 6/2015 |
| EP | 2927480 A1 | 10/2015 |
| EP | 1167755 B1 | 12/2015 |
| WO | WO 2015084173 A1 | 6/2015 |

OTHER PUBLICATIONS

Non-English Chinese Office Action dated Dec. 28, 2018 for Application No. 201710203229.9.

* cited by examiner

ROTATIONAL MOVEMENT CONTROL OF AN ELECTRIC GENERATOR BY MEANS OF A TURNING DEVICE

CROSS-REFERENCES TO RELATED APPLICATIONS

This application claims priority to U.S. application Ser. No. 62/315,257 and EP Application No. 16163002.5 and DE Application No. 102016205250.0, all having a filing date of Mar. 30, 2016, the entire contents of all priority documents which are incorporated herein by reference.

FIELD OF TECHNOLOGY

The following relates to the technical field of electric generators, in particular electric generators for wind turbines. Specifically, the following relates to an electric generator having a stator assembly, a rotor assembly, and means for temporarily blocking a rotational movement of the rotor (with respect to the stator) in order to allow maintenance work. Further, the following relates to a generator system and to a wind turbine comprising such an electric generator. Furthermore, the following relates to a method for rotating the rotor assembly of such an electric generator in a controlled manner.

BACKGROUND

Wind turbines are used to convert mechanical wind energy to electrical energy in a clean and efficient way. In a wind turbine a mechanical drive train comprising a wind rotor with several rotor blades drives an electric generator, either directly or by means of a gearbox. The resulting alternating current (AC) frequency that is developed at stator terminals of the electric generator is directly proportional to the speed of rotation of the wind rotor.

In order to provide an AC power signal being matched with a utility grid a wind turbine comprises a power converter, which includes a generator side AC-DC converter, a DC bridge, and a grid side DC-AC converter. The AC-DC converter and the DC-AC converter typically comprise several high power semiconductor switches which are arranged in a bridge configuration for each phase of the AC current.

Wind turbines can be erected on-shore or off-shore. Large wind turbines are typically installed off-shore. In particular for maintenance reasons self-excited generators having a rotor assembly with permanent magnets are employed. For efficiency reasons an air gap between (a) the coils of stator segments of the stator assembly and (b) the (permanent) magnets of the rotor assembly should be kept small. Therefore, such a large generator must be built up with an extreme high constructional precision. Further, the large size of such a generator requires special solutions not only for assembling but also for maintaining the generator. A maintenance work may include e.g. an exchange of a magnet on the rotor side and an exchange of a stator segment on the stator side. It is obvious that for maintaining a generator a rotation of the rotor assembly with respect to the stator assembly must be prevented.

EP 2 566 017 A1 discloses a generator for a wind turbine. The generator comprises a stator assembly, a rotor assembly, and at least one rotor brake disk. The rotor brake disk extends in radial outward direction. Thus, an air gap extending between the stator assembly and the rotor assembly is freely accessible at all times from an axial direction leading to improvements regarding serviceability, particularly concerning an axial insertion or removal of magnets and stator segments.

SUMMARY

An aspect relates to a facilitating assembly and/or maintenance work for a large electric generator.

According to a first aspect of the invention there is provided an electric generator, in particular for a wind turbine. The electric generator comprises (a) a stator assembly; (b) a rotor assembly being rotatably supported at the stator assembly for rotating around a rotational axis; (c) an annular device being fixed to the rotor assembly and comprising an engagement structure; and (d) a first turning device being mounted to the stator assembly, the first turning device comprising an actuator and an engagement element being drivable by the actuator. The first turning device is configured for adopting two operational states: An active operational state and a passive operational state. In the active operational state there is an engagement between the engagement element and the engagement structure. In the passive operational state the engagement element and the engagement structure are mechanically decoupled from each other.

The described electric generator is based on the idea that by means of an engagement "on demand" (i.e. the first turning device is temporarily in the active operational state) the first turning device can cause the rotor assembly to move in a controlled manner such that it will be brought into a predetermined angular position. At the predetermined angular position the movement of the rotor assembly will be stopped by stopping the operation of the turning device. This can be achieved simply by stopping the operation of the actuator. Additionally, a brake system and/or a mechanical blocking system may be used in order to maintain a proper angular position of the rotor assembly.

The described predetermined angular position may be characterized in that it allows for an easy assembly or maintenance of the rotor assembly, e.g. exchange of generator components.

In accordance with usual nomenclature for defining the geometry of electric generators the rotational axis of the rotor assembly defines the axial direction of the generator. This nomenclature will also be used in this document.

In presently preferred embodiments the engagement element is realized by means of a gear and the engagement structure is realized by means of a curved toothed structure. Thereby, when the first turning device is in the active operational state the teeth of the gear engage with the toothed structure.

The curvature of the toothed structure corresponds to the radius of the annular structure. In case the first turning device engages at the radially outer surface of the annular device the toothed structure is formed at the radially outer surface of the annular structure. As a consequence, the curvature of the toothed structure corresponds to the outer radius of the annular structure. Although because of force transmission reasons this is considered at least presently as a preferred solution it is of course also possible that the toothed structure is formed at the radially inner surface of the annular structure.

According to an embodiment of the invention the generator has an inner stator-outer rotor configuration. Alternatively, the generator may have an outer stator-inner rotor configuration. With respect to the rotational axis (a) an inner edge of the annular device has an inner radius and (b) an outer edge of the annular device has an outer radius. Further, with respect to a stator radius of the stator assembly (c) the outer radius is larger than 50% but less than 85%, in particular less than 75%, and more particularly less than 65% and/or (d) the inner radius is larger than 40% but less than 75%, in particular less than 65%, and more particularly less than 55%.

Descriptive speaking, when the first turning device is in operation the force transmission into a frame structure of the stator assembly will act into a radially middle annular portion of the stator assembly. This may provide the advantage that a radially outer annular portion of the stator assembly may be constructed in a mechanically less stable manner. This may contribute to a reduction of the weight of the stator assembly without reducing its effective mechanical stability.

In this respect it is mentioned that around the rotational axis a radially inner space of the generator might not be free because it is occupied by a main bearing of the generator. The described radial extension of the annular device may therefore be limited towards smaller diameters by the radial extension of the main bearing, which supports the rotor assembly relative to the stator assembly.

The mentioned stator radius may be the outer radius of a stator frame at which the first turning device is fixed or attached. It should be clear that in the described inner stator-outer rotor configuration stator segments comprising conductor coils, in which during normal operation of the generator magnetic induction takes place, are mounted at the outer circumference of the stator assembly.

The generator may have a diameter larger than 7 m, in particular larger than 8 m, and more particular larger than 9 m. Even a diameter of 10 m and more is possible. Thereby, the outer size of the rotor assembly or alternatively of the stator assembly may define the geometric dimension of the generator along a direction perpendicular to the rotational axis.

In between the stator segments respectively its conductor coils and (permanent) magnets of the rotor assembly there is formed an air gap which according to preferred embodiments has a size of less than 25 mm, in particular less than 20 mm, more particular less than 15 mm. It should be clear that in view or the large size of the generator this small air gap requires a very high geometric precision and mechanical stability of both the stator assembly, the rotor assembly, and a bearing system between the stator assembly and the rotor assembly. Therefore, a smoothly acting first turning device and the above mentioned dimension of the annular device with respect to stator radius may be essential in order to guarantee are high degree of serviceability respectively an easy maintenance of the described generator.

According to a further embodiment of the invention the first turning device is mounted to the stator assembly in a shiftable manner such that for changing the operational state from the active operational state to the passive operational state at least a part the first turning device is shifted with respect to the stator assembly along an axial direction being parallel to the rotational axis and/or at least partial along a radial direction being perpendicular to the rotational axis. This may allow for an easy decoupling between the engagement element and the engagement device.

It should be clear that a change from the passive operational state to the active operational state requires a shift of the first turning device along the opposite direction.

It is pointed out that shifting the first turning device does not necessarily require that the actuator and an engagement element are shifted along the same direction. It may also be possible that the actuator and the engagement element are shifted in opposite directions. This means that the entire axial extension of the first turning device is changed. Specifically, when performing a change from the active operational state to the passive operational state this extension may be enlarged. Thereby, an adapter element having a sufficient large extension along the axial direction may be inserted between the actuator and an engagement element.

Shifting the actuator and the engagement element in opposite axial directions for changing the operational state of the first turning device may provide the advantage that both the installation space for the first turning device can be kept comparatively small and in the passive operational state a completely free movement of the rotor assembly will be possible wherein there is not given any hindrance caused by the first turning device.

According to a further embodiment of the invention the first turning device is configured for rotating the rotor assembly only when the rotor assembly is mechanically coupled with a balanced wind rotor. This may mean that the first turning device may be a comparatively weak mechanical device which can be realized within a geometrically small and compact design. Further, a comparatively weak first turning device can be economically manufactured.

Due to a compact design and/or a cheap fabrication of the first turning device the first turning device may be fixedly installed at the stator assembly. This means that the first turning device is a permanent component of the generator which will be always ready to be used.

In this document "balanced" means that the center of gravity of all rotor blades being installed at the hub of the wind rotor coincides at least approximately with the rotational axis.

According to a further embodiment of the invention the electric generator further comprises at least one further first turning device being mounted to the stator assembly, the further first turning device comprising a further actuator and a further engagement element being drivable by the further actuator. Thereby, also the further first turning device is configured for adopting two operational states, an active operational state and a passive operational state, wherein (i) in the active operational state there is an engagement between the further engagement element and the engagement structure and (ii) in the passive operational state the further engagement element and the engagement structure are mechanically decoupled from each other.

Providing at least one further first turning device may provide the advantage that even with a weak and small dimensioned (further) first turning devices a comparatively large moment of force can be applied to the rotor assembly. Thereby, it might be of advantage if the first turning device and the at least one further first turning device are circumferentially distributed around the rotational axis. This may allow for a circumferentially at least approximately uniform force transmission into the rotor assembly, which of course also has an impact on mechanical deformations of the stator assembly. For this reason a more or less circumferentially uniform force transmission may provide an important contribution that the above mentioned small air gap will stay stable also when the first turning device and the at least one further turning device are active.

With respect to the number of further first turning devices there is no principal limitation. Because of efficiency and constructional reasons presently a number of 7 to 15, preferably 9 to 13 further first turning devices seems to be appropriate.

It is mentioned that the further first turning device may be of the same type as the first turning device. Specifically, the further first turning device may fulfil the same technical specifications as the first turning device.

According to a further embodiment of the invention the stator assembly comprises a mechanical interface for accommodating a second turning device, which comprises a drive unit and an engagement device being drivable by the drive unit. When the second turning device is accommodated by the mechanical interface, there is an engagement between the engagement device and the engagement structure.

By contrast to the first (further) turning device the described second turning device may be significantly stronger. This may provide the advantage that higher moments of force can be applied to the rotor assembly, which allows for faster angular accelerations. Thereby, an angular acceleration may be either a positive acceleration or a negative acceleration causing a slowing down of a rotational movement.

Compared to the engagement element the described engagement device may have the same or at least similar structural features. The second turning device may differ from the first turning device only in that the drive unit is more powerful than the actuator of the first turning device.

According to a further embodiment of the invention the second turning device is capable for rotating the rotor assembly even when the rotor assembly is mechanically coupled with an unbalanced wind rotor.

With the help of a sufficiently strong second turning device a mounting of a rotor blade to the hub of the wind rotor as well as a demounting of a rotor blade from the hub can be effectively facilitated by bringing the rotor assembly and, as a consequence also the hub respectively the unbalanced wind rotor, into a predetermined angular position.

In this respect it is again mentioned that the wind rotor encompassing a hub and wind turbine blades attached thereto is coupled either directly or by means of a gearbox to the rotor assembly. In particular, when mounting a blade to or demounting a blade from the hub the hub may be brought into an angular position wherein the respective blade is in the lowest ("6 o'clock") angular position. However, it is mentioned that in many applications, in particular in case of off-shore wind turbines, a blade exchange may be realized with a so called "horizontal single blade mounting". In such a procedure the respective blade is in a horizontal position ("3 o'clock; 9 o'clock") when being attached to or removed from the hub. This may provide the advantage that when delivering a new blade to be installed in a horizontal orientation there is no need to reorient this blade by rotating it into a vertical orientation before attaching it to the hub. Such a procedure is highly insensitive with respect to negative environmental conditions such as high wind speed.

According to a further embodiment of the invention the mechanical interface is configured for accommodating the second turning device in a detachable manner. This may provide the advantage that the second turning device may only be installed when an assembly and/or a maintenance work has to be carried out which requires large moments of force to be applied to the rotor assembly. Specifically, the second turning device may be used only when the rotor assembly being coupled with an unbalanced wind rotor has to be rotated in a controlled manner.

Installing the second turning device only for some specific assembly and/or a maintenance work may provide the advantage that the second turning device can be held available for several generators. This reduces the manufacturing costs for the described generator while keeping all options for performing (rarely required) assembly and/or maintenance work with an unbalanced wind rotor.

In this respect it is mentioned that the described mechanical interface may also be configured for allowing a radial movement of an installed second turning device such that it can be shifted between an active operational state (there is an engagement with the engagement structure) and a passive operational state (there is no engagement with the engagement structure).

According to a further embodiment of the invention the stator assembly comprises at least one further mechanical interface for accommodating a further second turning device, which comprises a further drive unit and a further engagement device being drivable by the further drive unit. When the further second turning device is accommodated by the further mechanical interface, there is an engagement between the further engagement device and the engagement structure.

Providing at least one further second turning device may have the advantage that the moment of force, which can be applied to the rotor assembly, can be further increased. Similarly, compared to the first and the at least one further first turning device it might be of advantage if the second turning device and the at least one further second turning device are circumferentially distributed around the rotational axis. This may allow for a circumferentially at least approximately uniform force transmission into the rotor assembly, which of course and in particular if large moments of forces are needed also has an impact on mechanical deformations of the stator assembly. As has already been mentioned above with respect to the first and the further first turning device this may provide a contribution to keep the size of the (small) air gap stable.

Also with respect to the number of further mechanical interfaces respectively further second turning devices there is no principal limitation. Because of efficiency and constructional reasons presently a number of 1 to 7, preferably 3 to 5 further mechanical interfaces seems to be appropriate.

The further second turning device may be of the same type as the second turning device. Specifically, the further second turning device may fulfil the same technical specifications as the second turning device.

According to a further embodiment of the invention at the stator assembly a first angular distribution of the first turning device and the at least one further first turning device is asymmetric with respect to a circumference around the rotational axis. Alternatively or in combination a second angular distribution of the second turning device and the at least one further second turning device is asymmetric with respect to the circumference around the rotational axis. This may particularly mean that the distance between at least some neighboring turning devices along the described circumference is not always the same.

Providing a non-uniform angular distribution of (further) first and (further) second turning devices may provide the advantage that certain angular positions may not be occupied by any one of the turning devices. A "non-occupied" angular range may include a plurality of angular positions wherein the presence of any turning device might spatially restrict the presence of other components.

According to a further embodiment of the invention an angular range being associated with possible turning device positions being located below the rotational axis is free of the first turning device, the further first turning device, the second turning device, and the further second turning device. This may provide the advantage that below a shaft of the rotor assembly or of the stator assembly there will be no turning device which, because of its angular position, is not reachable by a crane having a rope, which crane can only reach a turning device from above (i.e. along a vertical direction parallel to the direction of gravity).

According to a further embodiment of the invention the electric generator further comprises a brake system comprising a caliper and a brake disk. The caliper is mounted to the stator assembly and the brake disk is at least a part of the annular device. This may provide the advantage that there is no need for a separate brake disk structure which would have to be mounted, in addition to the annular device, to the rotor assembly.

Specifically, the brake disk part of the annular device may face radially inwards and the engagement structure may face radially outwards. This design may provide the advantage that brake dust will be generated radially more inwards and, in case of the preferred inner stator-outer rotor configuration, "far" away from stator segments being located at the outer edge of the stator assembly. As consequence the comparatively sensitive electric coil windings of the stator segments will not be exposed to harmful brake dust. However, it is of course also possible to design the annular device in such a manner that the brake disk part faces radially outwards and the engagement structure faces radially inwards.

According to a further embodiment of the invention the brake disk part of the annular device has a diameter being smaller than 80%, preferably smaller than 70%, and more preferably smaller than 60% of the diameter of the stator assembly. This may provide the advantage that brake dust will be generated radially "far off" the stator windings of the generator.

It is again mentioned that a radially inner space of the generator might not be free because it is occupied by the main generator bearing. Preferably, the diameter of the annular device respectively of the brake disk part is close to the main bearing.

In this respect it is pointed out that the comparatively small diameter of the brake disk part of the annular device also causes a disadvantage: Due to leverage principles the moment of force which could be handled by the described brake system having a brake disk with a comparatively small diameter is relatively small. Therefore, according to a currently preferred design the brake system can only be used as a service brake which must only be put in operation when the rotor assembly respectively the wind rotor is running at very low speeds which could be realized by means of known blade pitching procedures.

In other embodiments the brake disk and the annular device are separate mechanical structures or pieces which, however, are both mounted (directly or indirectly) to or at the rotor assembly. This may provide the advantage that depending on the specific application both the brake disk and the annular device, in particular the engagement structure of the annular device, can be designed in a proper manner. Further, a two piece solution may allow, in particular in case of a different wearing of the two pieces, to replace only this piece which is necessary to be replaced due to its (bad) wearing status or due to any other damage.

According to a further embodiment of the invention the caliper is mounted to the stator assembly in a radially shiftable manner. In a first radial position of the caliper a braking interaction between the caliper and the brake disk part of the annular device is possible. Further, in a second radial position of the caliper a braking interaction between the caliper and the brake disk part of the annular device is not possible.

Descriptive speaking, in the second radial position the caliper has been radially shifted out from the annular device. The caliper may be set into this second position if the generator is in a usual operation mode, i.e. a wind turbine comprising the generator produces electric power. Any unwanted mechanical interaction between the caliper and the annular device which would slow down the rotational speed of the rotor assembly will be effectively prevented. In other words, the caliper may be set into the first position only when a braking effect may be needed.

Depending on the design of the annular space, namely whether the brake disk portion is located at the radially inner side or at the radially outer side of the annular device, the radial relationship between the first position and the second position may be different. In a currently preferred design where the radially inner part of the annular is the brake disk part and the engagement structure is formed at the radially outer surface of the annular device the first position, in which the brake system might become active, is more radially outward than the second position, in which the brake system cannot become active.

In this respect it is mentioned that in the second radial position the caliper may not be completely removed from the brake disk. This means that there is only a partial spatial overlap between the brake disk and a brake pad of the caliper such that when (unintentionally) activating the caliper there would establish a reduced braking interaction or braking force. Preferably, the second radial position is offset from the first radial position to such an extent that an exchange of a brake pad is possible.

According to a further embodiment of the invention the stator assembly comprises a guidance structure having a radial extension and the caliper comprises a guidance element which engages with the guidance structure. This may provide the advantage that shifting the caliper between the first radial position and the second radial position can be accomplished in an easy and effective manner.

In a very simple configuration the guidance structure may be realized by means of a slot formed within the stator assembly. The guidance element may simply be a at least one pin or bolt running within the slot. In other configurations the guidance structure may be realized by a rail or any other structure allowing for guiding the guidance element.

According to a further embodiment of the invention the electric generator further comprises a fixation system for detachably fixing the caliper either in the first radial position or in the second radial position. Thereby, the fixation system comprises first fixation means being associated with a fixation of the caliper in the first radial position and second fixation means being associated with a fixation of the caliper in the second radial position. In particular, the first fixation means allows for a mechanically stronger fixation of the caliper to the stator assembly than the second fixation means. This may provide the advantage that the fixation system can be designed respectively dimensioned in an effective manner wherein the fixation strength, which can be provided, is only as strong as necessary. Descriptively speaking, the fixation system may be not over-dimensioned which allows to realize the fixation system in reasonable prized manner.

According to a further embodiment of the invention the first fixation means comprises a plurality of axially shiftable bolts, which are arranged in a one- or two-dimensional array. Alternatively or in combination the second fixation means comprises a clamping device. This may provide the advantage that only in the first position there will be provided an extreme strong torsional strength which prevents the caliper from twisting around an axis being parallel to the rotational axis. In the second radial position there is not needed such a strong torsional strength because here the brake system cannot come in operation.

According to a further embodiment of the invention the electric generator further comprises at least one further brake system comprising a further caliper and the brake disk, wherein the further caliper is mounted to the stator assembly.

Providing at least one further brake system may provide the advantage that the brake force transmission between the stator assembly and the rotor assembly may be circumferentially distributed. In order to optimize this effect the brake system and the at least one further brake system may be circumferentially distributed around the rotational axis. Thereby, all calipers engage with the same brake disk.

Providing several brake systems respectively several calipers may allow for a circumferentially at least approximately uniform force transmission into the rotor assembly, which of course also has an impact on mechanical deformations of the stator assembly. For this reason a more or less circumferentially uniform force transmission may provide an important contribution that the above mentioned (small) air gap will stay stable also when the brake system and the at least one further brake system are active.

With respect to the number of further brake systems there is no principal limitation. Because of efficiency and constructional reasons presently a number of 7 to 15, preferably 9 to 13 further brake systems seems to be appropriate.

It is mentioned that the at least one further brake system may be of the same type as the brake systems. Specifically, the at least one further brake system may fulfil the same technical specifications as the brake system.

According to a further embodiment of the invention the electric generator further comprises a rotor lock system, which comprises at least one axially shiftable piston. In a first position the piston interlocks a rotational movement of the rotor assembly with respect to the stator assembly. In a second position a rotational movement of the rotor assembly with respect to the stator assembly is enabled.

The described rotor lock system may be used in particular if the rotor assembly should be fixed at an angular position at which there is a strong imbalance of the rotor assembly respectively of a wind rotor being rotatory coupled with the rotor assembly. Such an imbalance may occur in particular during a mounting or demounting procedure of a blade to or from the hub of the wind rotor.

A pneumatic actuator may be used for shifting the piston. Preferably, for each piston a separate (pneumatic) actuator may be provided.

Providing a comparatively large number of axially shiftable pistons, e.g. more than 12, may provide the advantage that the corresponding blocking force will be distributed along the circumferential direction. This yields smaller deformations of both the stator assembly and the rotor assembly such that, as has already been mentioned above, the size of even a small air gap can be kept stable. In particular, there is no risk of an unwanted mechanical contact between the electric coils of the stator segments and the magnets of the (outer) rotor assembly which could cause serious damages to the generator.

It is mentioned that the total number of axially shiftable pistons may be subdivided in permanently installed axially shiftable pistons and temporarily installable axially shiftable pistons, wherein the latter may only be used if a rotation of the rotor assembly has to be blocked while there is a large imbalance. Correspondingly to the above mentioned (further) second turning devices, which can be installed via mechanical interfaces, also appropriate interfaces may be provided at the stator assembly for detachably installing the temporarily installable axially shiftable pistons together with respective (pneumatic) actuators for axially shifting the same.

According to a further aspect of the invention there is provided a generator system comprising (a) an electric generator as described above and (b) the second turning device, which is accommodated within the mechanical interface.

According to a further aspect of the invention there is provided a wind turbine for generating electrical power, in particular an off-shore wind turbine. The provided the wind turbine comprises (a) a tower, (b) a wind rotor, which is arranged on top of the tower and which comprises at least two blade, and (c) an electric generator as described above. The electric generator is mechanically coupled with the wind rotor.

According to a further aspect of the invention there is provided a method for controlling a rotational movement of an electric generator as described above. The provided method comprises (a) changing the operational state of the first turning device from the passive operational state to the active operational state; and (b) controlling the operation of the actuator such that with respect to the stator assembly the rotor assembly moves towards a desired angular position.

Also the described method is based on the idea that with the first turning device, which has been brought into the active operational state, i.e. the engagement element engages the engagement structure of the annular device, a (slow) controlled rotation of the rotor assembly can be realized which sets the rotor assembly into an angular position in which assembly and/or maintenance work can be carried out in an effective manner. Such assembly and/or maintenance work may in particular include an insertion or removal of stator segments in or from the rotor assembly or an insertion or removal of permanent magnets in respectively from the stator assembly. Further, more heavy assembly and/or maintenance work may be a mounting or a demounting a blade to respectively from the hub of the wind rotor.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The following will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

Figure 1:
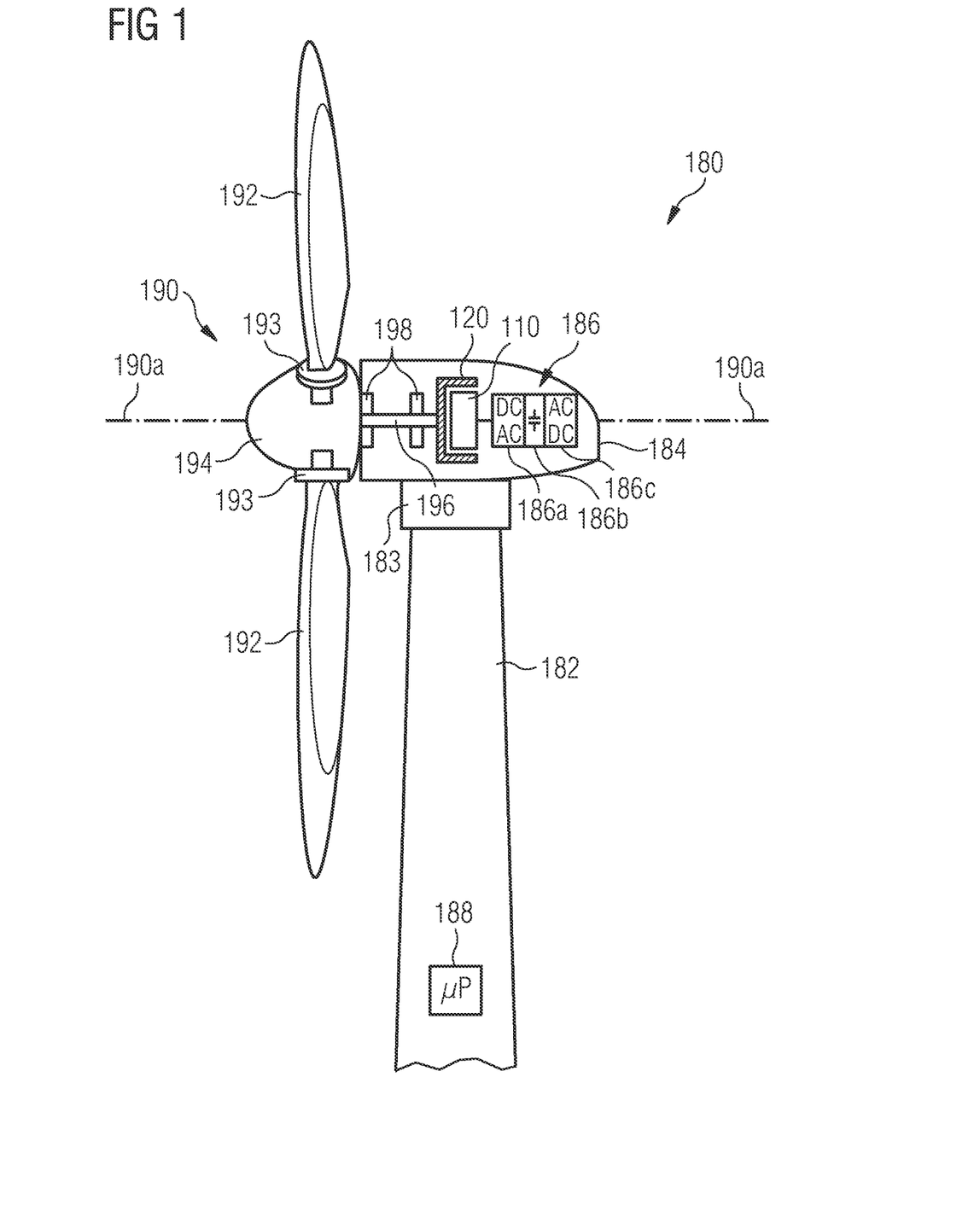
FIG. 1 shows a wind turbine comprising an electric generator, in accordance with embodiments of the present invention.

FIG. 1 shows a wind turbine 180 according to an embodiment of the invention. The wind turbine 180 comprises a tower 182, which is mounted on a non-depicted fundament. On top of the tower 182 there is arranged a nacelle 184. In between the tower 182 and the nacelle 184 there is provided a yaw angle adjustment device 183, which is capable of rotating the nacelle 184 around a not depicted vertical axis, which is aligned with the longitudinal extension of the tower 182. By controlling the yaw angle adjustment device 183 in an appropriate manner it can be made sure, that during a normal operation of the wind turbine 180 the nacelle 184 is always properly aligned with the current wind direction.

The wind turbine 180 further comprises a wind rotor 190 having three blades 192. In the perspective of FIG. 1 only two blades 192 are visible. The wind rotor 190 is rotatable around a rotational axis 190a. The blades 192, which are mounted at a hub 194, extend radially with respect to the rotational axis 190a.

In between the hub 194 and a blade 192 there is respectively provided a blade adjustment device 193 in order to adjust the blade pitch angle of each blade 192 by rotating the respective blade 192 around a not depicted axis being aligned substantially parallel with the longitudinal extension of the blade 192. By controlling the blade adjustment device 193 the blade pitch angle of the respective blade 192 can be adjusted in such a manner that at least when the wind is not so strong a maximum wind power can be retrieved from the available wind power. However, the blade pitch angle can also be intentionally adjusted to a position, in which only a reduced wind power can be captured.

Within the nacelle 184 there is provided an electric generator 100. In accordance with basic principles of electrical engineering the electric generator 100 comprises a stator assembly 110 and a rotor assembly 120. According to the embodiment described hear the electric generator 100 in realized with a so called inner stator-outer rotor configuration. Permanent magnets being attached to the rotor assembly 120 travel around stator segments being attached at the stator assembly 110. In between the stator segments, which comprise coils for picking up a time alternating magnetic induction, and the permanent magnets there is formed an air gap. According to the exemplary embodiment described here the stator assembly 110 has an outer diameter in the order of 10 m and the air gap has a size of 10 mm. From these dimensions one can recognize that there are extreme high demands regarding the mechanical precision and stability for both the stator assembly 110 and the rotor assembly 120.

The wind rotor 190 is rotationally coupled with the rotor assembly 120 by means of a rotatable shaft. A schematically depicted bearing assembly 198 is provided in order to hold in place both the wind rotor 190 and the rotor assembly 120. As can be seen from FIG. 1 the shaft 196 extends along the rotational axis 190a.

It is mentioned that the wind turbine 180 is a so called direct drive wind turbine wherein between wind rotor 190 and rotor assembly 120 the is not provided a gear box. However, it is mentioned that the electric generator 100 could also be driven indirectly via a gear box, which may be used to convert the number of revolutions of the wind rotor 190 into a higher number of revolutions of the rotor assembly 120.

Further, a not depicted brake may be provided in order to stop the operation of the wind turbine 180 or to reduce the rotational speed of the wind rotor 190 for instance (a) in case of an emergency, (b) in case of too strong wind conditions, which might harm the wind turbine 180, and/or (c) in case of an intentional saving of the consumed fatigue life time and/or the fatigue life time consumption rate of at least one structural component, in particular the blades 192, of the wind turbine 180.

In order to provide an AC power signal being matched with a utility grid the electric output of the stator assembly 110 is electrically connected to a power converter 186. The power converter 186 comprises a generator side AC-DC converter 186a, an intermediate DC bridge 186b, and a grid side DC-AC converter 186c. The AC-DC converter 186a and the DC-AC converter 196c comprise several not depicted high power semiconductor switches which in a known manner are arranged in a bridge configuration for each phase of an AC current provided by the electric generator 100.

The wind turbine 180 further comprises a control system 188 for operating the wind turbine 100 in a highly efficient manner. Apart from controlling for instance the yaw angle adjustment device 183 the depicted control system 188 is also used for adjusting the blade pitch angle of the blades 192 of the wind rotor 190 in an optimized manner.

Figure 2:
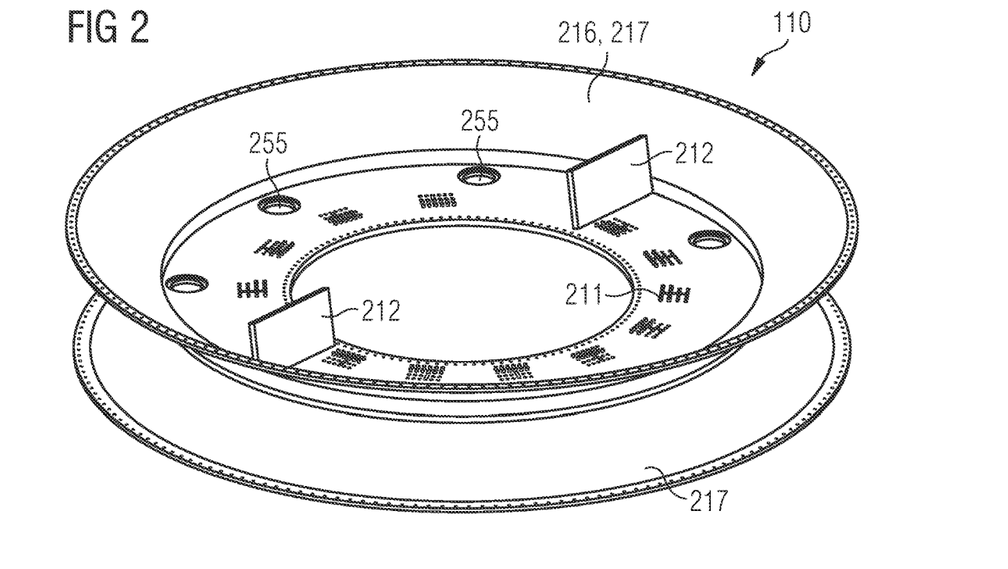
FIG. 2 shows a stator assembly of the electric generator, in accordance with embodiments of the present invention.

FIG. 2 shows in more detail the stator assembly 110 of the electric generator 100. The stator assembly 110 comprises a radially inner support structure 211 and a radially outer support structure 216. Along the radial direction the outer support structure 216 forks apart into two slanted portions 217. As could be best seen in a not depicted cross sectional view the two slanted portions 217 define a wedged space being used for accommodating functional components such as e.g. cooling respectively heat exchange installations. At the radial outer side of two slanted portions 217 and approximately at the two outer edges of the slanted portions 217 there are located not depicted stator segments. The stator segments comprise conductor coils, in which during normal operation of the generator magnetic induction takes place.

Within the inner support structure there are formed several circular openings 255. These openings represent mechanical interfaces 255 at which, as will be described below in more detail, turning devices can be mounted in a fixed or in a detachable manner, which may be used for rotating the rotor assembly 120 in a smooth manner.

As can be seen from FIG. 2, at the inner support structure 211 there are mounted two plates 212. These plates serve as platforms 212 onto which human worker can stand in order to carry out assembly and/or maintenance work.

It is mentioned that due to the above mentioned extreme high demands regarding the mechanical precision and stability of the stator assembly 110 the inner support structure 211 as well as the outer support structure 216 with its slanted portions 217 are realized by means of a large single piece component wherein several high precision welding connections are used in order to meet the high mechanical demands.

Figure 3:
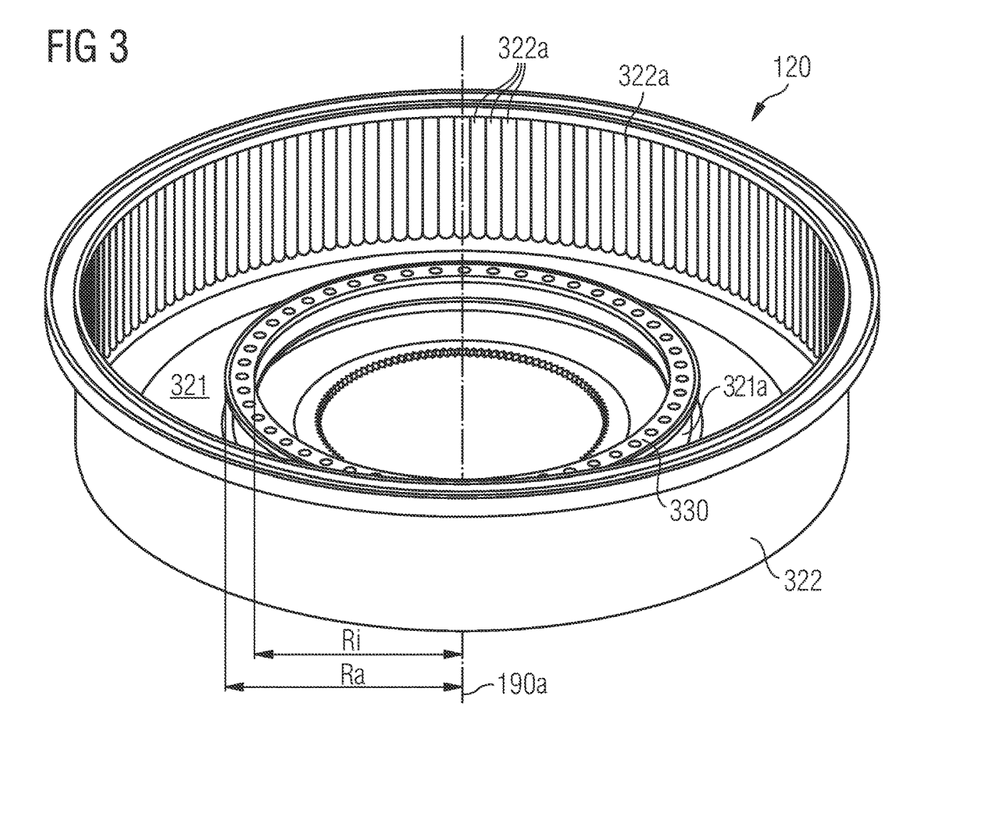
FIG. 3 shows a rotor assembly of the electric generator, in accordance with embodiments of the present invention.

FIG. 3 shows in more detail the rotor assembly 120 of the electric generator 100. The rotor assembly 120 comprises a annular base plate 321. The inner large opening of the base plate 321 serves to accommodate respectively to connect the rotor assembly 120 with the main bearing 196 which is schematically indicated in FIG. 1. At the outer edge of the base plate 321 there is attached a circumferential ring 322. At the inner side of the circumferential ring 322 there are formed slots 322a into which not depicted permanent magnets can be inserted. In operation these magnets provide the time alternating magnet flux which is picked up by the coils of the stator segments in order to generate AC current.

Approximately at a radial middle portion of the annular base plate 321 there is erected a circular flange 321a. The circular flange 321a extends from the base plate 321 along an axial direction which is parallel to the rotational axis 190a depicted in FIG. 1. On top of the flange there is mounted an annular device 330. As will be described below in detail, off time normal operation this annular device 330 is used both (a) for rotating the rotor assembly 120 in a controlled manner e.g. for maintenance procedures and (b) for slowing down a rotational movement of the rotor assembly 120 in a controlled manner.

Figure 4:
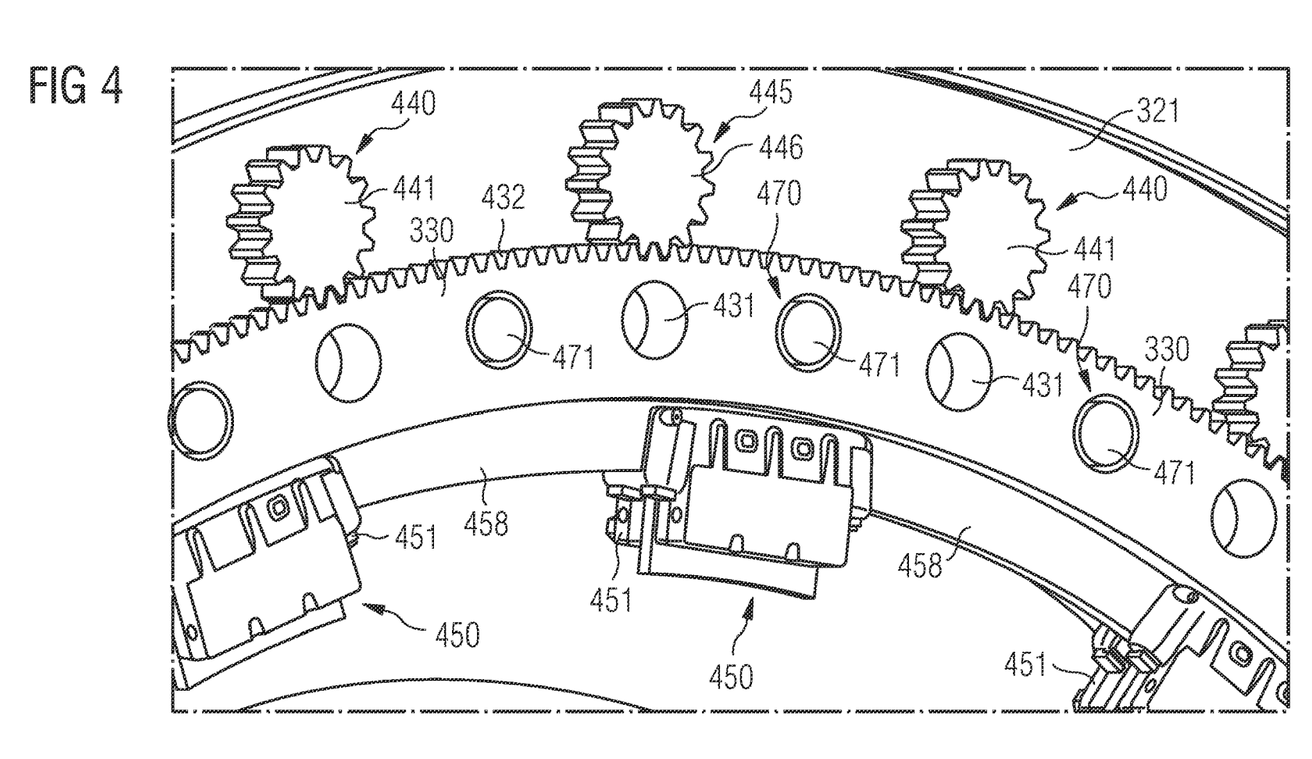
FIG. 4 shows in an enlarged view an annular device which is attached to the rotor assembly and which comprises a (a) an engagement structure for driving a rotor assembly rotation and (b) a brake disk for stopping a rotor assembly rotation, in accordance with embodiments of the present invention.

FIG. 4 shows in an enlarged view the annular device 330 being attached to the rotor assembly 120. At its radially outer surface the annular device 330 comprises an engagement structure 432. According to the exemplary embodiment described here the engagement structure is realized by means of a toothed surface structure 432. At least when there is assembly and/or maintenance work to do, the engagement structure 432 engages with an engagement element 441 of a first turning device 440 which is mounted to the base plate 321.

According to the exemplary embodiment described here along a circumferential direction there are provided several first turning devices 440 which are installed in a fixed respectively not detachable manner at the base plate 321. In an active operational state of these first turning devices 440 there is an engagement between the respective engagement element 441 and the engagement structure 432. In a passive operational state the respective engagement element 441 and the engagement structure 432 are mechanically decoupled from each other. A transition between the passive operational state, which is given in a normal operation of the generator 100, and the active operational state, which is given when a controlled rotation of the rotor assembly 120 is desired, is made by shifting the respective engagement element 441 along a rotational axis of the respective first turning device 440.

Along the circumferential direction there are further provided several second turning devices 445. By contrast to the first turning device 440 these second turning devices 445 are installed only temporarily within respectively at the mechanical interfaces 255 depicted in FIG. 2. Each second turning device 445 comprises an engagement device 446 which also engages with the engagement structure 432. According to the exemplary embodiment described here the second turning devices 445 are only installed respectively used in a maintenance or assembly work in which the wind rotor 190 is mechanically unbalanced because there is missing at least one blade 192.

In this respect it is mentioned that rather than having the first turning device(s) 440 and/or the second turning device(s) 445 act directly on the teeth of the engagement structure 432, there is the option to place and mount the first turning device(s) 440 and/or the second turning device(s) 445 a bit away from the annular device 330 and thus act indirectly on the engagement structure 432 through one or more intermediate tooth wheels. This may in particular be of advantage when the respective turning device is used as a service turning device, as it could be mounted permanently at the (inner support structure 211) of the entire stator support structure even during a usual operation of the electric generator 100. When service is needed, the intermediate tooth wheel(s) can simply be placed in between the respective engagement element 441 or engagement device 446 in order to make the respective turning device operably active. After service work has finished the intermediate tooth wheel(s) can be removed.

As can be further seen from FIG. 4, the generator 100 comprises several brake systems 450 which are also arranged along a perimeter surrounding the rotational axis 190a. Each brake system 450 comprises a caliper 451 which is mounted to the stator assembly 110. When activating the break system 450 the caliper 451 interacts with a (common) brake disk 458 being mounted to the rotor assembly 120. According to the exemplary embodiment described here the brake disk 458 is an inner portion of the annular device 330.

It is pointed out that by contrast to the constructive design depicted in FIG. 4 the brake disk and the annular device may be made of different (annular) pieces which are both mounted to or form a part of the rotor assembly. The two annular pieces may have different diameters and/or may be positioned at different axial positions with respect to the rotational axis 190a. This may allow to realize the rotor assembly with various different geometric structures which significantly increases the constructive freedom for design.

It is mentioned that in the embodiment described here the entirety of all the brake systems 450 is not being used as an emergency brake for stopping a rotation of the wind rotor 190 e.g. in case of emergency. The entirety of brake systems 450 is merely used as a so called service brake, which allows for further slowing down and stopping the rotor assembly 120 when being (already slowly) rotated for assembly and/or maintenance work.

As can be further seen from FIG. 4, the electric generator 100 further comprises a rotor lock system 470, which can be activated in order to prevent any unwanted rotation of the rotor assembly 120 and/or of the wind rotor 190. According to the exemplary embodiment described here there are provided several rotor lock systems 470 which are arranged at a perimeter around the rotational axis 190*a* and which are mounted to the stator assembly 110. Each rotor lock system 470 comprises an axially shiftable piston 471, which, when activating the respective rotor lock system 470, is pushed forward in order to engage with respectively one engagement opening 431.

In the embodiment shown in FIG. 4 all engagement elements 441 are of the same type. In particular, all engagement elements 441 being realized as a gear engaging with the engagement structure 432 have the same diameter. However, it may also be possible that the gears 441, 446 have different diameters such that at least some turning devices are radially shifted with respect to the other turning devices. This may provide the advantage that without any additional gears there will be realized different gear ratios for different turning devices.

Figure 5:
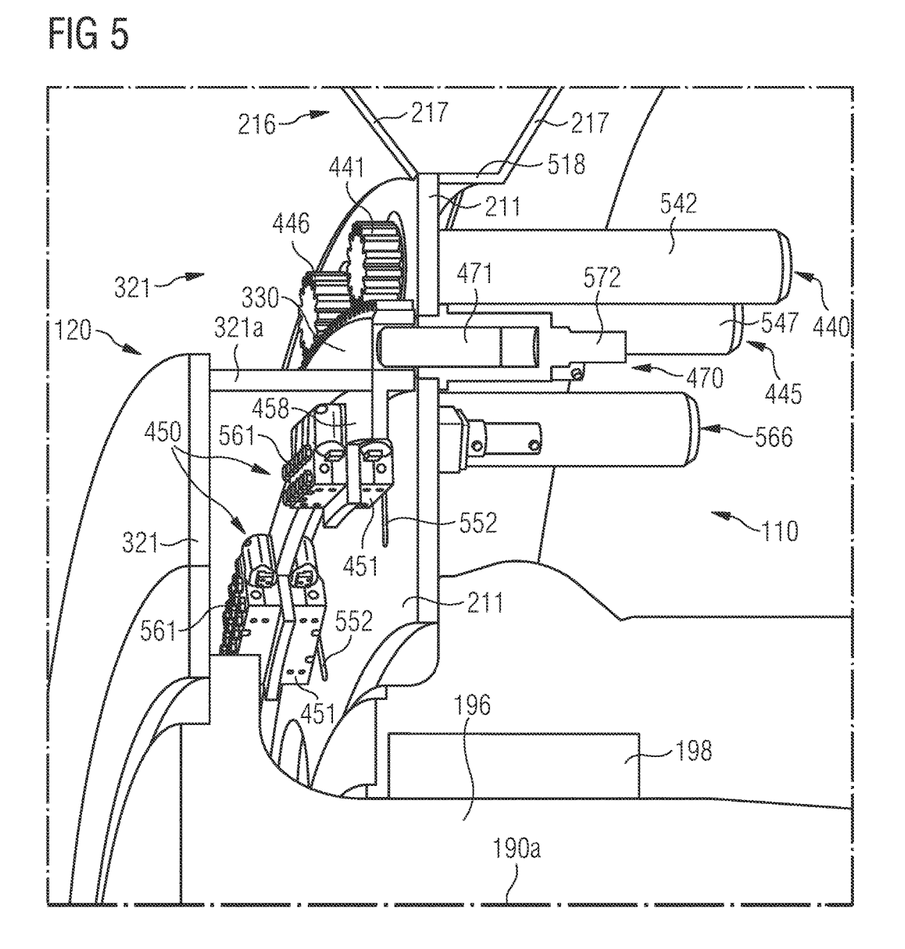
FIG. 5 shows a perspective half sectional view of the stator assembly and the rotor assembly, in accordance with embodiments of the present invention.

FIG. 5 shows a perspective half sectional view of the stator assembly 110 and the rotor assembly 120. It can be seen how the rotor assembly 120 is connected to the shaft 196, whereas the shaft 196 is supported within a bearing 198 at the stator assembly 110. In the enlarged view of FIG. 5 not the complete rotor assembly 120 but merely the base plate 321 as well as the flange 321*a* can be seen. The annular device 330 is firmly attached to the flange 321*a*.

At this point it is mentioned that the flange 321*a* not only has the purpose to arrange the annular device 330 along an axial direction close to the inner support structure 211 of the stator assembly 110. The flange 321*a* may also contribute to a mechanical strengthening of the entire rotor assembly 120.

Compared to the illustration in FIG. 2 the outer support structure 216 with its two slanted portions 217 are depicted in more detail. In order to enlarge the accommodation space in between the two slanted portions 217 the right slanted portion 217 is not formed directly at the inner support structure 211 but at an axial flange 518 which is formed in between the outer edge of the inner support structure 211 and the right slanted portion 217.

In FIG. 5 there can be clearly seen an actuator 542 of one of the first turning devices 440, a drive unit 547 of one of the second turning devices 445, and a hydraulic motor 572 of one of the rotor lock systems 470. Both the actuator 542, the drive unit 547, and the hydraulic motor 572 are mounted to the inner support structure 211 and extend towards the right side thereof.

According to the exemplary embodiment described here each caliper 451 is mounted to the inner support structure 211 in a radially shiftable manner. In a first radial (outer) position of the caliper 451 a braking interaction between the caliper 451 and the brake disk 458 will be achieved when the caliper 451 is activated. In a second radial (inner) position of the caliper 451 the caliper 451 has shifted away from the brake disk 458 of the annular device 330. As a consequence, a braking interaction between the caliper 451 and the brake disk 458 is not possible. Descriptive speaking, when activating the caliper 451 its brake linings would "grab into the empty space".

According to the exemplary embodiment described here shifting the caliper 451 in between its first radial (outer) position and its second radial (inner) position is accomplished by means of a position system 566 which is also attached to the inner support structure 211 of the stator assembly 110. In order to allow for a precise radial movement of the respective caliper 451 a guidance structure 552 is formed within the inner support structure 211. As can be seen from FIG. 5, the guidance structure is realized by means of a slot 552 which extends in a radial direction. For temporarily fixing the caliper 451 in its radial (outer) position a first fixation means 561 is provided at the caliper 451. According to the exemplary embodiment described here the first fixation means is realized by means of a plurality of shiftable bolts 561.

It is again pointed out that the brake disk and the annular device are separate mechanical structures or pieces. These pieces, which in view of the rotational symmetry of the rotor assembly, should both have an annular shape, may be arranged or positioned with a radial offset and/or with an axial offset with respect to each other. In this context a pure radial offset may mean that the annular brake disk and the annular device are spatially arranged in a concentric manner with each other and have the same axial position along the rotational axis. Further, a pure axial offset may mean that the annular brake disk and the annular device have basically the same diameter but have different axial positions. Preferably, both a radial offset and an axial offset are given.

Figure 6:
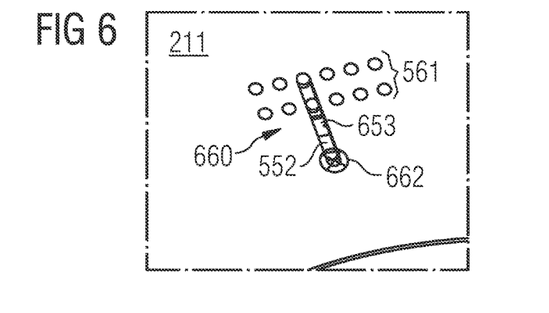
FIG. 6 shows a mechanism allowing for a radial shift of a caliper capable of interacting with the brake disk, in accordance with embodiments of the present invention.

FIG. 6 shows a mechanism allowing for the above described radial shift of the (not shown) caliper 451 in more detail. A guidance element 653 of the caliper 451 is guided within the slot 552. In order to prevent an unwanted rotation of the caliper 451 the guidance element is realized by means of an elongated stud.

A schematically depicted fixation system 660 ensures that the caliper 451 can be fixed either in the first radial (outer) position or in the second radial (inner) position. As has already been mentioned above, the first fixation means is realized by means of the shiftable bolts 561 which are attached to a housing of the caliper 451. Since in the first radial (outer) position a strong braking force may occur upon activation of the respective caliper 451 the first fixation 561 means must be mechanically very stable. In order to achieve such a stability and to prevent an unwanted rotation of the caliper 451 during a braking action, the shiftable bolts 561 are arranged in a two dimensional array. According to the exemplary embodiment described here this array comprises two rows of respectively six bolts. Of course, also other spatial arrangements of bolts are possible.

When activating the first fixation means 561 all but two shiftable bolts engage into a corresponding opening formed within the inner support structure 211. The remaining two shiftable bolts engage within the slot 552. A second fixation means 662 is used to fix the caliper 451 at its second radial (inner) position. Here, there are no braking forces which have to be absorbed. Therefore, in the depicted example the second fixation means is realized by means of a simple clamping device, which in FIG. 6 is schematically depicted and denominated with reference numeral 662.

Figure 7:
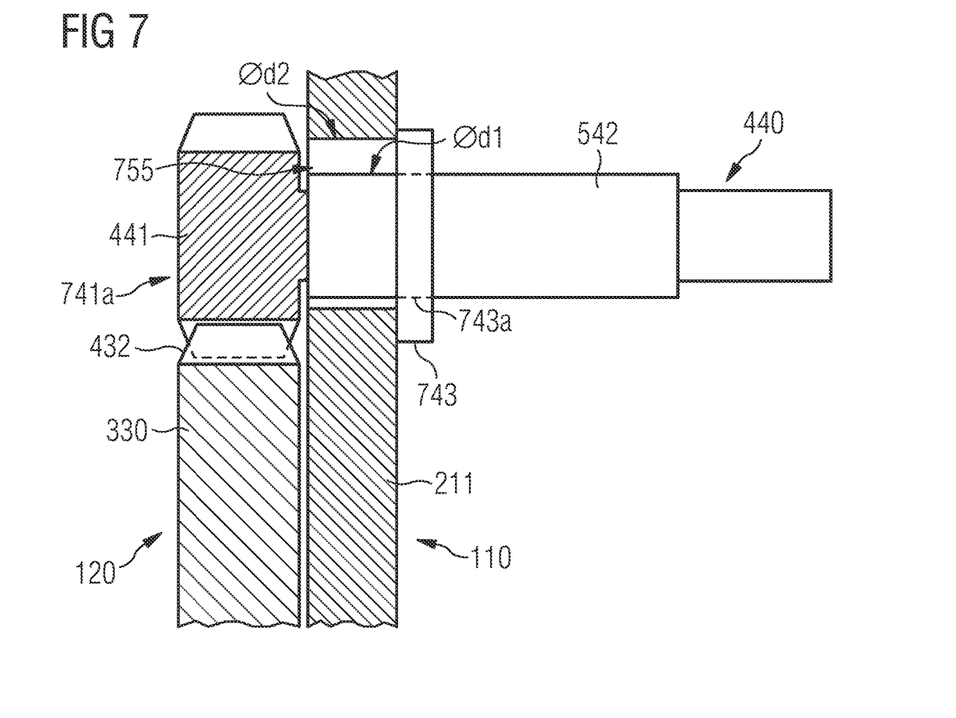
FIG. 7 schematically illustrates a mechanism for fixing the turning device in two different radial positions, in accordance with embodiments of the present invention.

FIG. 7 shows in accordance with a further embodiment a mechanism for radially shifting a turning device 440 between (a) a first radial (inner) position corresponding to an active operational state and (b) a second radial (inner) position corresponding to an active operational state of the turning device 440. In this embodiment the turning device 440, which comprises the actuator 542 and the engagement element (gear) 441, is not directly mounted to the inner support structure 211 of the stator assembly 110. In fact, the turning device 440 is fixedly mounted to a flange plate 743 which itself can be radially shifted (in FIG. 7 along the vertical direction) at the inner support structure 211. In order to allow such a radial movement of the flange plate an opening 743a of the flange plate 743, which opening 743a according to the exemplary embodiment described here is completely occupied by the actuator 542, is smaller than an opening 755 formed within the inner support structure 211. The diameter of the opening 755 is indicated with Φd2, whereas the diameter of the opening 743a is indicated with Φd1.

FIG. 7 shows the mechanism in a radial position corresponding to the first operational state of the turning device 440. This can be seen by the radial position of the gear 441 which, in an engagement region 741a, engages with the (engagement structure 432 of the) annular device 330.

Figure 8A:
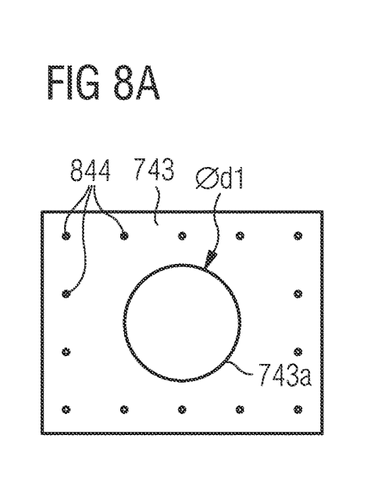
FIG. 8A schematically illustrates a mechanism for fixing the turning device in two different radial positions, in accordance with embodiments of the present invention.
Figure 8B:
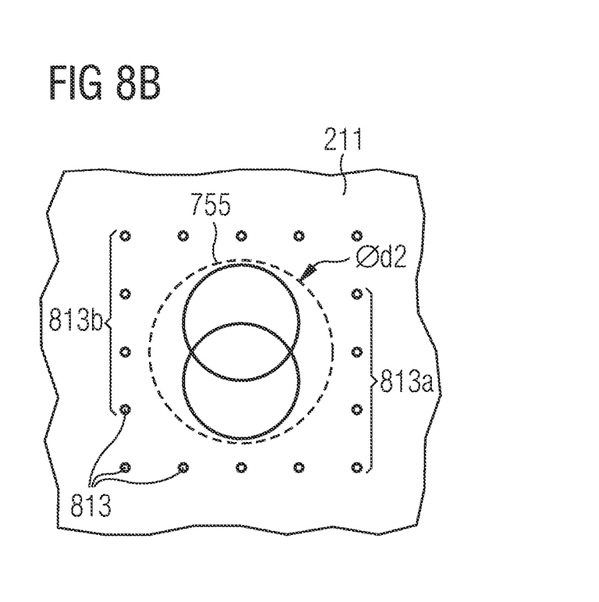
FIG. 8B schematically illustrates a mechanism for fixing the turning device in two different radial positions, in accordance with embodiments of the present invention

FIGS. 8a and 8b schematically illustrate a fixation structure according to an embodiment of the invention. The fixation structure comprises a plurality of fixation openings 813 formed in the inner support structure 211 (see FIG. 8b) and a plurality of fixation pins 844 formed at the flange plate 743 (see FIG. 8a). Both the fixation openings 813 and the fixation pins 844 are arranged in a two dimensional array (bott pattern).

As can be seen from a comparison between FIG. 8a and FIG. 8b, both arrays have the same number (five) of columns, whereas the array of the fixation pins 844 has a smaller number (four) of rows than the array of the fixation openings 813, which has five rows. Further, the periodicity of both arrays is the same both along the rows and along the columns of the arrays.

Under the provision that the two arrays respectively its positions must be aligned with each other in order to allow for an engagement between a fixation pins 844 into a corresponding fixation openings 813 there are two different (radial) positions in which the flange plate 743 can be attached to the inner support structure 211. Specifically, when using the fixation openings 813a the flange plate 743 respectively the turning device 440 will be in a first radial (inner) position which results in an engagement between the gear 441 and the engagement structure 432. Correspondingly, when using the fixation openings 813b the flange plate 743 respectively the turning device 440 will be in a second radial (outer) position which results in a disengagement between the gear 441 and the engagement structure 432.

In FIG. 8b these two radial positions (for the actuator 542 of the turning device 440) are illustrated by two circles drawn with full lines. The lower circle is associated with the first radial (inner) position and the upper circle is associated with the second radial (outer) position. The opening 755 with the larger diameter Φd2 is illustrated with a circle drawn with a dashed line.

It should be clear that the number of rows and/or the number of columns of the two arrays is not restricted to the specific embodiment shown in FIGS. 8a and 8b. Depending on the specific application the person skilled in the art will find an appropriate number both for the rows and for the columns of both arrays. Further, it is mentioned that the pins 844 and the openings 813 can be exchanged with each other. This means that in other embodiments the inner support structure is provided with pins and the flange plate 743 is provided with openings. Furthermore, also any other types of structural elements allowing for a proper engagement between the inner support structure 211 and the flange plate 743 are possible.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:
1. An electric generator for a wind turbine, the electric generator comprising:
  a stator assembly;
  a rotor assembly being rotatably supported at the stator assembly for rotating around a rotational axis;
  an annular device being fixed to the rotor assembly and comprising an engagement structure; and
  a first turning device being mounted to the stator assembly, the first turning device comprising an actuator and an engagement element being drivable by the actuator;
  wherein the first turning device is configured for adopting two operational states, an active operational state, and a passive operational state, wherein:
  (i) in the active operational state there is an engagement between the engagement element and the engagement structure, and
  (ii) in the passive operational state, the engagement element and the engagement structure are mechanically decoupled from each other;
  at least one further first turning device being mounted to the stator assembly, the further first turning device comprising a further actuator and a further engagement element being drivable by the further actuator;
  wherein also the at least one further first turning device is configured for adopting two operational states, an active operational state and a passive operational state, wherein:
  (i) in the active operational state there is an engagement between the further engagement element and the engagement structure, and
  (ii) in the passive operational state the further engagement element and the engagement structure are mechanically decoupled from each other.
2. The electric generator as set forth in claim 1, further comprising an inner stator-outer rotor configuration or an outer stator-inner rotor configuration, and
  with respect to the rotational axis: (a) an inner edge of the annular device has an inner radius (Ri), and
  (b) an outer edge of the annular device has an outer radius (Ra); and
  with respect to a stator radius of the stator assembly: (a) the outer radius is larger than 50% but less than 85%, and/or
  (b) the inner radius is larger than 40% but less than 75%.
3. The electric generator as set forth in claim 1, wherein the first turning device is mounted to the stator assembly in a shiftable manner such that for changing the operational state from the active operational state to the passive operational state at least a part the first turning device is shifted with respect to the stator assembly along an axial direction being parallel to the rotational axis and/or along a radial direction being perpendicular to the rotational axis.
4. The electric generator as set forth in claim 1, wherein the first turning device is configured for rotating the rotor assembly only when the rotor assembly is mechanically coupled with a balanced wind rotor.

5. The electric generator as set forth in claim 1, wherein the stator assembly comprises a mechanical interface for accommodating a second turning device, the second turning device comprising a drive unit and an engagement device being drivable by the drive unit, wherein, when the second turning device is accommodated by the mechanical interface, there is an engagement between the engagement device and the engagement structure.

6. The electric generator as set forth in claim 5, wherein the second turning device is capable for rotating the rotor assembly even when the rotor assembly is mechanically coupled with an unbalanced wind rotor.

7. The electric generator as set forth in claim 5, wherein the mechanical interface is configured for accommodating the second turning device in a detachable manner.

8. The electric generator as set forth in claim 5, wherein the stator assembly comprises at least one further mechanical interface for accommodating a further second turning device, the further second turning device comprising a further drive unit and a further engagement device being drivable by the further drive unit, wherein, when the further second turning device is accommodated by the further mechanical interface, there is an engagement between the further engagement device and the engagement structure.

9. The electric generator as set forth in claim 1, wherein at the stator assembly:
   a first angular distribution of the first turning device and the at least one further first turning device is asymmetric with respect to a circumference around the rotational axis and/or
   a second angular distribution of the second turning device and the at least one further second turning device is asymmetric with respect to the circumference around the rotational axis.

10. The electric generator as set forth in claim 9, wherein an angular range being associated with possible turning device positions being located below the rotational axis is free of the first turning device, the further first turning device, the second turning device, and the further second turning device.

11. A generator system comprising
   an electric generator as set forth in claim 5, and
   the second turning device, which is accommodated within the mechanical interface.

12. A wind turbine for generating electrical power, the wind turbine comprising:
   a tower;
   a wind rotor, which is arranged at a top portion of the tower and which comprises at least one blade; and
   an electric generator as set forth in claim 1, wherein the electric generator is mechanically coupled with the wind rotor.

13. A method for controlling a rotational movement of an electric generator as set forth in claim 1, the method comprising
   changing the operational state of the first turning device from the passive operational state to the active operational state; and
   controlling the operation of the actuator such that with respect to the stator assembly the rotor assembly moves towards a desired angular position.

* * * * *